US011574531B2

(12) United States Patent
Phillips

(10) Patent No.: US 11,574,531 B2
(45) Date of Patent: Feb. 7, 2023

(54) SYSTEMS AND METHODS FOR ACQUIRING DATA FROM ARTICLES OF MERCHANDISE ON DISPLAY

(71) Applicant: InVue Security Products Inc., Charlotte, NC (US)

(72) Inventor: Jonathon D. Phillips, Fort Mill, SC (US)

(73) Assignee: InVue Secuirty Products Inc., Charlotte, NC (US)

( * ) Notice: Subject to any disclaimer, the term of this patent is extended or adjusted under 35 U.S.C. 154(b) by 0 days.

(21) Appl. No.: 17/121,169

(22) Filed: Dec. 14, 2020

(65) Prior Publication Data
US 2021/0097825 A1 Apr. 1, 2021

Related U.S. Application Data

(63) Continuation of application No. 16/348,035, filed as application No. PCT/US2017/060364 on Nov. 7, 2017, now abandoned.
(Continued)

(51) Int. Cl.
*G08B 13/14* (2006.01)
*H04B 10/116* (2013.01)
*H04B 10/114* (2013.01)

(52) U.S. Cl.
CPC ..... *G08B 13/1409* (2013.01); *G08B 13/1445* (2013.01); *H04B 10/114* (2013.01); *H04B 10/116* (2013.01)

(58) Field of Classification Search
CPC .. G08B 13/1409; H04B 10/114; H04B 10/116
(Continued)

(56) References Cited

U.S. PATENT DOCUMENTS 8,077,037 B2 12/2011 Leyden et al.
8,452,868 B2 5/2013 Shafer et al.
(Continued)

FOREIGN PATENT DOCUMENTS

CN 106056178 10/2016
KR 10-2013-0143155 * 10/2013
(Continued)

OTHER PUBLICATIONS

International Search Report and Written Opinion from related International Application No. PCT/2016/017483, dated May 2, 2016 (11 pages).
(Continued)

*Primary Examiner* — Omar Casillashernandez
(74) *Attorney, Agent, or Firm* — InVue Security Products Inc.

(57) ABSTRACT

Embodiments of the present invention are directed to systems, devices, and methods for displaying and securing articles of merchandise. In one example, a merchandise security system includes a plurality of security devices. Each of the security devices is configured to be attached to an article of merchandise and includes an illumination source for generating a light signal. The system also includes at least one computing device configured to communicate with the illumination sources in order to obtain data from the security devices and/or the articles of merchandise. Each of the security devices is configured to configured to generate a security signal in response to removal of the article of merchandise from the security device.

23 Claims, 2 Drawing Sheets

Related U.S. Application Data

(60) Provisional application No. 62/418,875, filed on Nov. 8, 2016.

(58) Field of Classification Search
USPC .................................................. 340/568.1
See application file for complete search history.

(56) References Cited

U.S. PATENT DOCUMENTS

| | | | |
|---|---|---|---|
| 8,558,688 B2 | 10/2013 | Henson et al. | |
| 8,564,438 B2 | 10/2013 | Fawcett et al. | |
| 8,581,985 B2 | 11/2013 | Fawcett et al. | |
| 8,624,737 B2 | 1/2014 | Irmscher et al. | |
| 9,443,404 B2 | 9/2016 | Grant et al. | |
| 9,659,472 B2 | 5/2017 | Fawcett et al. | |
| 9,786,140 B2 | 10/2017 | Henson et al. | |
| 9,811,988 B2 | 11/2017 | Grant et al. | |
| 9,818,274 B2 | 11/2017 | Fawcett et al. | |
| 10,002,506 B2 | 6/2018 | Baker et al. | |
| 10,062,250 B2 | 8/2018 | Grant et al. | |
| 10,078,945 B2 | 9/2018 | Grant et al. | |
| 10,127,745 B2 | 11/2018 | Grant et al. | |
| 10,210,681 B1 | 2/2019 | Grant et al. | |
| 10,258,172 B2 | 4/2019 | Grant et al. | |
| 10,290,192 B2 | 5/2019 | Grant et al. | |
| 10,347,061 B2 | 7/2019 | Grant et al. | |
| 10,475,308 B2 | 11/2019 | Grant et al. | |
| 10,529,201 B2 | 1/2020 | Grant et al. | |
| 10,827,854 B2 | 11/2020 | Grant et al. | |
| 2005/0198077 A1 | 9/2005 | Van Der Heijden | |
| 2007/0150331 A1 | 6/2007 | Perri et al. | |
| 2007/0180234 A1* | 8/2007 | Labaton | H04L 9/3234 713/159 |
| 2007/0194918 A1 | 8/2007 | Rabinowitz et al. | |
| 2010/0231388 A1 | 9/2010 | Shute et al. | |
| 2011/0309934 A1 | 12/2011 | Henson et al. | |
| 2012/0055985 A1 | 3/2012 | Allen | |
| 2012/0119910 A1 | 5/2012 | Belden, Jr. et al. | |
| 2012/0280810 A1 | 11/2012 | Wheeler | |
| 2013/0108065 A1 | 5/2013 | Mullins et al. | |
| 2013/0132279 A1 | 5/2013 | Nordstrom | |
| 2013/0188044 A1* | 7/2013 | Tsou | H04N 7/181 348/143 |
| 2013/0238516 A1 | 9/2013 | Moock et al. | |
| 2013/0268316 A1* | 10/2013 | Moock | H04M 1/72454 705/7.29 |
| 2013/0284806 A1 | 10/2013 | Margalit | |
| 2014/0036074 A1* | 2/2014 | Fawcett | G08B 13/1445 348/143 |
| 2014/0111337 A1* | 4/2014 | Taylor | G08B 13/1409 340/568.3 |
| 2014/0172649 A1 | 6/2014 | Cancro et al. | |
| 2014/0172650 A1 | 6/2014 | Cancro et al. | |
| 2014/0186026 A1* | 7/2014 | Oshima | H04B 10/116 398/25 |
| 2014/0266723 A1* | 9/2014 | Grant | F16B 47/003 340/568.2 |
| 2014/0266724 A1 | 9/2014 | Taylor | |
| 2014/0340225 A1 | 11/2014 | Grant et al. | |
| 2015/0235533 A1 | 8/2015 | Grant et al. | |
| 2016/0055469 A1 | 2/2016 | Kim et al. | |
| 2016/0140820 A1 | 5/2016 | Joesph | |
| 2016/0196485 A1 | 7/2016 | Patterson et al. | |
| 2016/0307209 A1 | 10/2016 | Marszalek | |
| 2016/0308952 A1 | 10/2016 | Marszalek et al. | |
| 2016/0335859 A1 | 11/2016 | Sankey | |
| 2017/0148288 A1 | 5/2017 | Baker et al. | |
| 2017/0164314 A1 | 6/2017 | Wylie et al. | |
| 2017/0193780 A1 | 7/2017 | Moock et al. | |
| 2017/0206757 A1 | 7/2017 | Grant et al. | |
| 2017/0221327 A1* | 8/2017 | Wu | G08B 25/10 |
| 2017/0301199 A1 | 10/2017 | Blaser et al. | |
| 2017/0372543 A1 | 12/2017 | Grant et al. | |
| 2018/0007648 A1 | 1/2018 | Wylie et al. | |
| 2018/0025598 A1 | 1/2018 | Fawcett et al. | |
| 2018/0035827 A1 | 2/2018 | Grant et al. | |
| 2018/0061197 A1 | 3/2018 | Grant et al. | |
| 2018/0077200 A1* | 3/2018 | Apvrille | H04L 63/1416 |
| 2018/0288720 A1 | 10/2018 | Blaser et al. | |
| 2018/0288721 A1 | 10/2018 | Blaser et al. | |
| 2018/0288722 A1* | 10/2018 | Blaser | H04L 67/12 |
| 2018/0322748 A1* | 11/2018 | Henson | G08B 13/1445 |
| 2018/0323872 A1* | 11/2018 | Miyamoto | H04B 10/116 |
| 2018/0365948 A1 | 12/2018 | Grant et al. | |
| 2019/0272689 A1 | 9/2019 | Grant et al. | |
| 2019/0279476 A1 | 9/2019 | Phillips | |
| 2020/0143641 A1 | 5/2020 | Grant et al. | |
| 2020/0234522 A1 | 7/2020 | Grant et al. | |
| 2020/0323365 A1 | 10/2020 | Grant et al. | |

FOREIGN PATENT DOCUMENTS

| | | | |
|---|---|---|---|
| KR | 20130143155 | 12/2013 | |
| WO | 2014134718 A1 | 9/2014 | |
| WO | 2015112336 A1 | 7/2015 | |
| WO | 2015138605 A1 | 9/2015 | |
| WO | 2016081189 A1 | 5/2016 | |
| WO | 2016130762 A1 | 8/2016 | |
| WO | WO-2016130762 A1 * | 8/2016 | G08B 25/014 |

OTHER PUBLICATIONS

"J-Plug Pro: The Security and Screensaver App", <http://usa.multplx.com/products/jplug_pro_app/>, dated Nov. 4, 2014 (5 pages).

"My Monitor: For Multplx Apps", <http://usa.multplx.com/products/my_monitor/>, dated Nov. 4, 2014 (4 pages).

"Product Me", <http://www.stacey-europe.com/product-me.html>, dated Nov. 4, 2014 (2 pages).

Extended European Search Report from related European Patent Application No. 16749856.7, dated Sep. 20, 2018 (7 pages).

International Search Report and Written Opinion from corresponding International Application No. PCT/US2017/060364, dated Mar. 8, 2018 (11 pages).

Robarts, Stu. "Supermarket's 'indoor sat-nav' guides shoppers to discounts", retrieved on Jul. 28, 2015 from <http://www.gizmag.com/carrefour-philips-indoor-positioning-systems/37631/> (7 pages).

\* cited by examiner

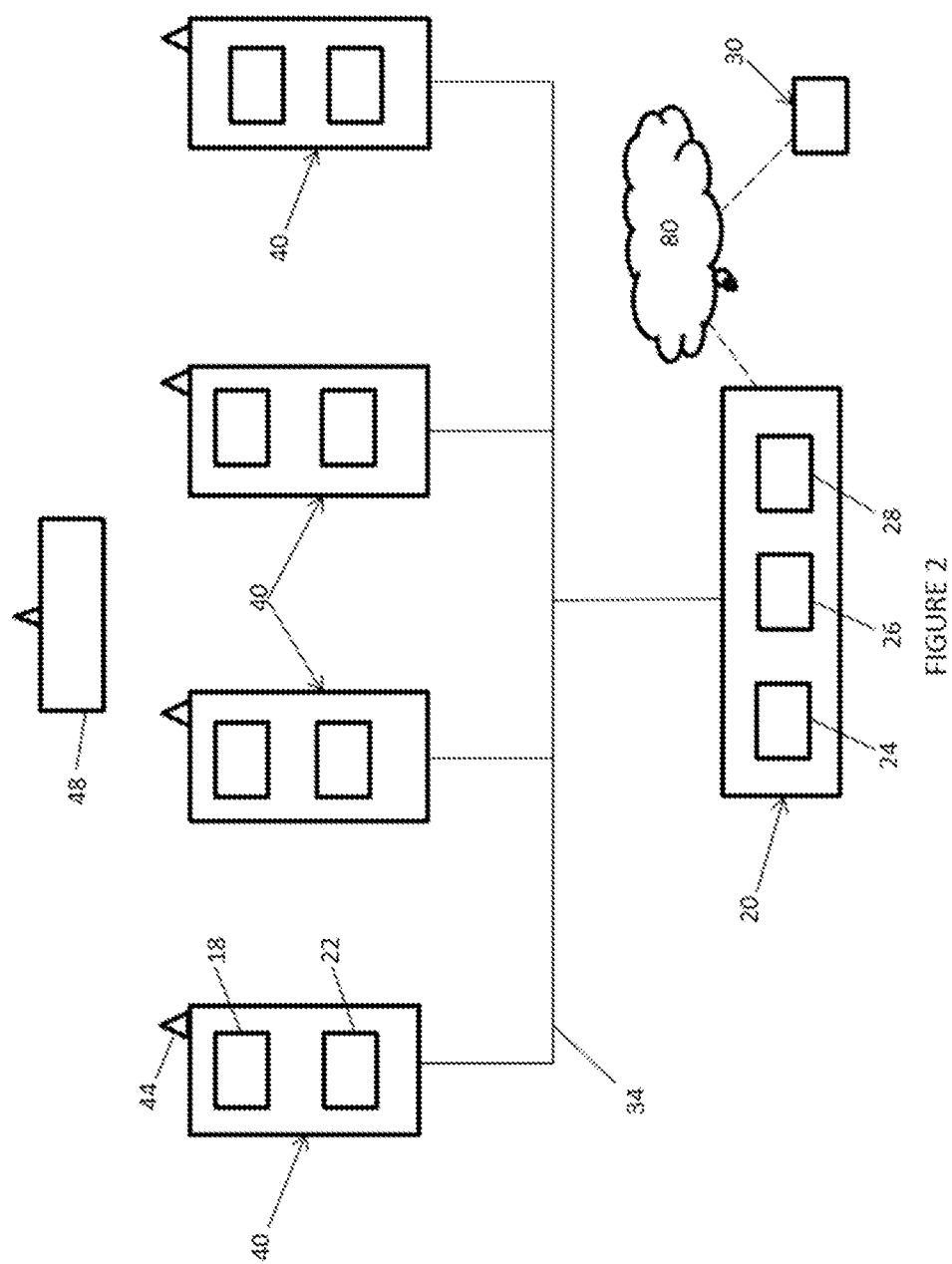

SYSTEMS AND METHODS FOR ACQUIRING DATA FROM ARTICLES OF MERCHANDISE ON DISPLAY

CROSS REFERENCE TO RELATED APPLICATIONS

The present application is continuation of U.S. application Ser. No. 16/348,035, filed on May 7, 2019, which is a 371 national stage entry of International Application No. PCT/US2017/060364, filed Nov. 7, 2017, which claims priority to U.S. Provisional Application No. 62/418,875, filed Nov. 8, 2016, the entire disclosures of which are incorporated by reference herein.

FIELD OF THE INVENTION

Embodiments of the present invention relate generally to merchandise display systems and methods, in particular, to systems and methods for acquiring data from articles of merchandise on display.

BACKGROUND OF THE INVENTION

Retailers routinely display articles of merchandise, such as phones, portable computers (e.g. notebooks, laptops, tablets, etc.), e-readers, media players, and the like for customers to evaluate before making a purchase. These articles of merchandise are continually being made smaller and lighter in weight due to advances in technology and materials. As a result, such merchandise is increasingly vulnerable and susceptible to theft. At the same time, the retail price and profit margin for such merchandise continues to decline. Accordingly, these articles of merchandise need to be secured by a security device that effectively and cost efficiently protects the merchandise from theft.

BRIEF SUMMARY

Embodiments of the present invention are directed towards merchandise security systems and methods. In one example, a merchandise security device includes a plurality of security devices. Each of the security devices is configured to be attached to an article of merchandise, and each of the security devices comprising an illumination source for generating a light signal. The merchandise security device also includes at least one computing device configured to communicate with the illumination sources in order to obtain data from the security devices and/or the articles of merchandise, wherein each of the security devices is configured to configured to generate a security signal in response to removal of the article of merchandise from the security device.

In another embodiment, a method for displaying and securing articles of merchandise is provided. The method includes generating a light signal with an illumination source associated with a security device and/or an article of merchandise, and detecting the light signal with a computing device. The method further includes obtaining data from the security device and/or the article of merchandise based on the light signal, and generating a security signal in response to removal of the article of merchandise from the security device.

In another embodiment, a merchandise security system is provided and includes at least one security device configured to be attached to an article of merchandise. The merchandise security system also includes an illumination source associated with the security device and/or the article of merchandise, wherein the illumination source is configured to generate a light signal. In addition, the merchandise security system includes at least one computing device configured to communicate with the illumination source in order to obtain data from the security device and/or the article of merchandise, wherein the security device is configured to generate a security signal in response to removal of the article of merchandise from the security device.

In one embodiment, a merchandise security system includes at least one security device configured to be attached to an article of merchandise, wherein the at least one security device and/or the article of merchandise is configured to capture an image obtaining data for identifying the article of merchandise. The merchandise security system also includes at least one computing device configured to communicate with the at least one security device and/or the article of merchandise in order to obtain the data from the security device and/or the article of merchandise.

In another embodiment, a merchandise security system includes at least one security device configured to be attached to an article of merchandise, wherein the at least one security device and/or the article of merchandise is configured to capture an image obtaining data for identifying the article of merchandise. The merchandise security system also includes at least one computing device configured to communicate with the at least one security device and/or the article of merchandise in order to obtain the data from the security device and/or the article of merchandise.

BRIEF DESCRIPTION OF THE DRAWINGS

FIG. 2 is a schematic of a merchandise security system according to another embodiment of the present invention.

DETAILED DESCRIPTION

Figure 1:
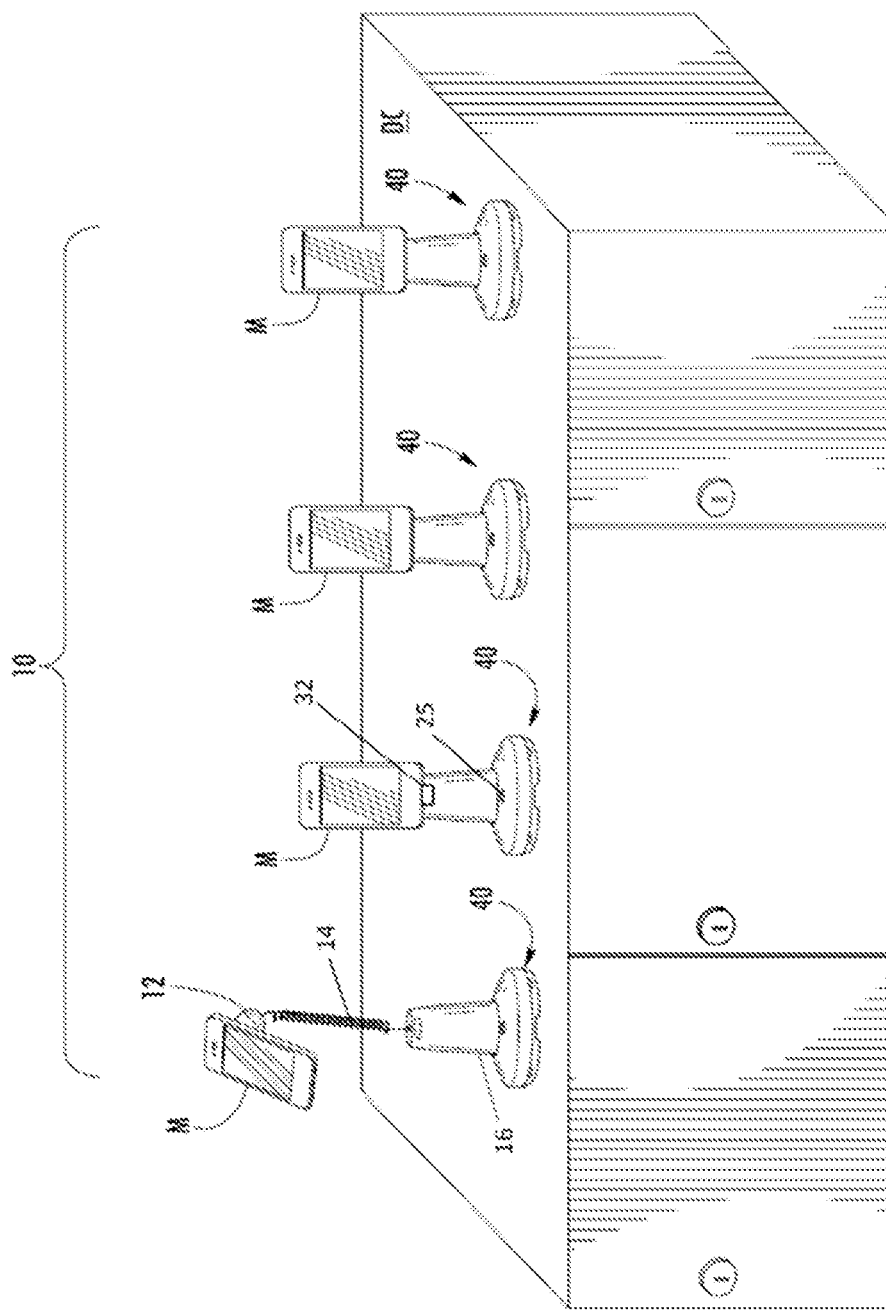
FIG. 1 illustrates a merchandise security system according to one embodiment of the present invention.

Embodiments of the present invention will now be described more fully hereinafter with reference to the accompanying drawings, in which various embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation and multiple prime notations are used to indicate similar elements in alternative embodiments.

One or more embodiments of a system for displaying and securing an article of merchandise "M" are described below and shown. The article of merchandise M is typically a display model or an operational sample of electronic merchandise, such as portable telephones, smart phones, computers (e.g. notebooks, laptops, tablets, etc.), e-readers, media players, and the like, for a customer to examine before making a decision to purchase the item. Thus, the article of merchandise may be any type of portable electronic device. The article of merchandise M is typically displayed in a manner that permits a prospective purchaser to evaluate the operation and features of the merchandise, while protecting the merchandise from a potential thief. In one embodiment, a sensor may be attached to the article of merchandise for detecting various alarming conditions, such as the article being removed from the sensor.

FIG. 1 illustrates an embodiment of a merchandise security system 10 for securing articles of merchandise M from theft or unauthorized removal. The system 10 generally includes one or more display positions, wherein each display position includes a security device 40 that is supported on a display counter "DC" (e.g., a counter, shelf, support, or the like). A security device 40 may generally include a sensor 12, a tether 14, and a base 16, although other arrangements may be contemplated (e.g., omitting the tether). The sensor 12 is configured to be secured to the article of merchandise M, such as with a pressure-sensitive adhesive, fasteners, and/or bracket arms. The sensor 12 is electrically connected to the tether 14, such as with a connector or via hardwiring. One end of the tether 14 may be electrically connected to the base 16, while the opposite end of the tether may be electrically connected to the sensor 12. The tether 14 and/or base 16 may be electrically connected to or otherwise in electrical communication with a controller 20, as explained in further detail below. In some embodiments, the tether 14 is electrically connected to a recoiler to allow the tether to extend and retract relative thereto. The recoiler may in turn be electrically connected to the controller 20. In other embodiments, the tether 14 is elastic or otherwise extendable and retractable relative to the base 16. Although four security devices are shown in FIGS. 1 and 2, it is understood that the controller 20 may be configured to communicate with any number of security devices, including one or more. Moreover, in some embodiments, one or more controllers 20 may be employed. In some embodiments, the controller 20 and the security devices 40 are independent of one another such that the controller may be positioned remotely from the security devices (e.g., under the display counter).

The base 16 is configured to removably support the sensor 12 thereon such that the sensor and article of merchandise M may be removed from the base for inspection and returned to the base. The base 16 may define an opening therethrough that allows the tether 14 to extend and retract relative to the base. It is understood that although a tethered embodiment is shown, it is understood that "tetherless" embodiments may also be utilized such as where the base 16 and the sensor 12 communicate wirelessly. For example, the base 16 and the sensor 12 may be configured to communicate wirelessly in order to ensure that the article of merchandise M is maintained within a predetermined location or distance relative to the base. In other embodiments, the article of merchandise M may be configured to be removably supported directly on the base 16 such that the sensor 12 may be integrated into the article. Example of wireless technology are disclosed in U.S. Pat. Nos. 8,878,673 and 9,437,088, the contents of which are hereby incorporated by reference in their entirety herein.

In some embodiments, the sensor 12 and/or base 16 may include alarming circuitry 18 or the like that is configured to determine whether various security events have occurred for generating a security signal, such as an audible and/or a visual alarm or signal (see, e.g., FIG. 2). The sensor 12 and/or base 16 may also include an alarm 22 (e.g., a piezoelectric device) that is configured to generate an audible alarm or signal. In some cases, the sensor 12 and/or base 16 may include a visual indicator (e.g., an LED) for emitting a visual signal when the alarming circuitry 18 is armed and/or alarming. Moreover, the sensor 12 and/or base 16 may include a transfer port 25 that is configured to communicate with a key for arming and/or disarming the alarming circuitry 18 (see, e.g., FIG. 1). In one embodiment, the transfer port 25 is configured to communicate wirelessly with a key in order to determine whether the key is authorized to arm and/or disarm the alarming circuitry 18. According to some embodiments, the key is similar to that described in U.S. Pat. No. 7,737,845, the contents of which are hereby incorporated by reference in their entirety herein. According to one embodiment, the sensor 12 may include a pressure switch or the like that is configured to detect when the article of merchandise M has been removed from the sensor. The alarming circuitry 18 may be configured to detect the removal of the article of merchandise M and/or cutting of the tether 14 and generate a security signal (e.g., an audible and/or a visual alarm) in response thereto.

The controller 20 may include a processor 24, CPU, or the like that is configured to facilitate communication with each of the security devices 40, both individually and collectively. For example, the controller 20 may be a digital interface box ("DIB") or a power interface box ("PIB") in some embodiments. The controller 20 may include communications circuitry 26 that is configured to transmit and receive signals and data from each of the security devices 40 and/or articles of merchandise M. The controller 20 may also include a memory 28 for storing various data regarding each of the security devices 40 and/or articles of merchandise M, as explained in further detail below. In one embodiment, the controller 20 is electrically connected to each of the security devices 40 via "wired" means, such as one or more electrical conductors 42. The controller 20 may be configured to transmit power to each of the security devices 40 and the articles of merchandise M via the electrical conductors 42. In other embodiments, the controller 20 and the security devices 40 may be configured to communicate with one another wirelessly. In order to provide power to the security devices 40, the security devices may utilize wireless power functionality, such as electrical contact or inductive charging technology. In addition, the controller 20 may be configured to transmit and/or regulate the voltage provided to each of the security devices 40 and/or articles of merchandise M. For example, the controller 20 may be in electrical communication with an input power source 46 and configured to transmit power at the appropriate voltage to each of the security devices 40 and the articles of merchandise M. Furthermore, it is understood that although the base 16 and controller 20 may be separate components in some embodiments, the base and controller may be integrated as a single component in other embodiments. For instance, the controller 20 may be housed in the base 16, and each base may include a respective controller.

In some embodiments, the controller 20 is configured to obtain data from the articles of merchandise M. For example, the data may be stored in a memory of the article of merchandise M, and the controller 20 may obtain at least a portion of the stored data. In some cases, the article of merchandise M may transmit the data from its internal memory to a sensor 12, controller 20, or any other desired device. The same controller 20 can communicate with the security devices 40 and the articles of merchandise, although it is understood that more than one controller could be employed, with separate controllers communicating with the security devices and articles of merchandise. The controller 20 may be configured to obtain the data directly or indirectly from the articles of merchandise. For example, each sensor 12 may be configured to communicate with a respective article of merchandise attached thereto to obtain data and subsequently communicate the data to the controller 20. In other embodiments, the controller 20 may receive the data directly from the articles of merchandise M. In some cases, the data is the type of article of merchandise M attached to a sensor 12 (e.g., a manufacturer and model of an article of merchandise). The type of article of merchandise M may allow the controller 20 to determine the power requirements of the specific type of article prior to sending power to the device. It is understood that various types of data and information may be obtained from the article of merchandise such as, for example, the number of "pulls" or "pickups" of a particular article of merchandise relative to the base, the type of article, the location of the article, the power status of the article, retail store information and location, the occurrence and time of a power loss to the security device, a key ID, number and time of interactions with a key, etc. Thus, the controller 20 may obtain data periodically or in real time, or a user could use a remote device 30 to request information regarding a specific article(s) of merchandise M by communicating with the controller 20. Additional examples of types of data that may be collected in response to interaction with the article of merchandise may be found, for example, in U.S. application Ser. No. 13/856,664, entitled Merchandise User Tracking System and Method, and International Application No. PCT/US2016/017483, entitled Systems and Methods for Acquiring Data from Articles of Merchandise on Display, the contents of which are hereby incorporated by reference in their entirety herein.

In some embodiments, the controller 20 and/or security device 40 may be configured to communicate with a remote device 30, such as a retailer's laptop, tablet, or other electronic device through a cloud network 80. In one example, the remote device 30 may be a retailer's electronic device for managing various data received from one or more controllers 20 and/or security devices 40. In one particular embodiment, a plurality of controllers 20 and/or security devices 40 are configured to communicate with one or more retailer's electronic devices over the network 80. For instance, the cloud network 80 may facilitate communication with a plurality of tablet devices used by sales associates within a retail environment. Communication over the network 80 may occur wirelessly. It is understood that the remote device 30, security device 40, and the controller 20 may communicate with any desired means, such as cellular networks, Wi-Fi, radiofrequency, Bluetooth communication, and the like. The controller 20, security device, and/or the remote device 30 may include communications circuitry or a transceiver that is configured to facilitate such communication with one another. One or more gateways and/or nodes may be used to facilitate communication between the controller 20, security device 40, and the retailer's electronic device(s). For instance, a gateway (e.g., a router) between the controller 20 and the cloud network 80 may be configured to facilitate communication with a retailer's gateway and may be configured to allow the retailer to provide and receive data from the system 10. The retailer may be able to direct various commands via the cloud network 80 such as, for example, ensuring planogram compliance and tracking system usage. In some embodiments, such commands could include requesting data from the controller 20, powering up or down one or more articles of merchandise M, performing a roll call of one or more articles of merchandise (either at a particular time or after an alarming event), determining a location of an alarming security device 40, identifying a specific key that armed/disarmed/locked/unlocked a particular security device, remotely enabling or disabling an article of merchandise, remotely locking down an article of merchandise, checking the power status of an article of merchandise, tracking usage of an article of merchandise, tracking one or more article of merchandise (e.g., via serial number or other ID), assigning particular keys to authorized users, and/or directing a camera to record the location of an alarming security device. As such, a retailer may be able to more effectively manage any number of features regarding one or more security devices 40.

In one embodiment, the security system 20 may utilize light-based technology (e.g., Visible Light Communication (VLC)) to determine various types of information regarding a security device 40 and/or article of merchandise M. For instance, the security device 40 and/or article of merchandise M may include an illumination source 44, such as an LED, that is configured to generate a uniquely coded light signal that may be used to provide various types of information and data and/or to determine the location of a particular illumination source 44 that is at a known location. The illumination source 44 may be configured to communicate with a computing device 48 that is configured to detect the uniquely coded light signals generated by the illumination source. For instance, the computing device 48 may include a camera for detecting such coded light signals. The coded light signals may be generated via activation of the illumination source 44 in a predetermined sequence or pattern. In some cases, the coded light signals may be indicative of specific information or data associated with the security device 40 and/or the article of merchandise, such as the types of information discussed above (e.g., a serial number of the article of merchandise). The computing device 48 may include a software application for facilitating communication with its camera and interpreting the light signals. Using the coded light signals, the computing device 48 may be configured to correlate the information or data with the security device 40 and/or the article of merchandise based on a known location of the security device and/or article of merchandise. For example, if a planogram indicates a particular location of a security device 40, the security device may be configured to communicate a light signal with information or data regarding the security device or associated article of merchandise. In other embodiments, the security device 40 and/or the article of merchandise M may be configured to communicate light signals indicative of its location. One or more computing devices 48 may be configured to communicate with one or more security devices 40, articles of merchandise M, controllers 20, and/or remote devices 30, such as via the cloud network 80, wired communications, and/or wireless communications. Thus, the security devices 40 and/or articles of merchandise M may be configured to communicate directly with the computing devices 48 in some embodiments. The computing device 48 may be configured to focus on, or block out, particular regions or zones that include security devices 40 and/or articles of merchandise M. In some cases, the computing device 48 may be configured to detect a particular QR code that may be associated with a security device 40 and/or an article of merchandise M. In this regard, the computing device 48 may be configured to detect the QR code and correlate the QR code with a particular security device 40 and/or article of merchandise M at a known location. Therefore, in some embodiments, VLC technology may be used to obtain various information regarding the security devices 40 and/or articles of merchandise M. It is understood that the computing device may include an illumination source for communicating various types of information to the security device 40 and/or the article of merchandise M in a similar manner. For instance, the article of merchandise M may include a camera for detecting light signals. Furthermore, it is understood that light signals may be used in combination with the embodiments discussed above such that various types of data and information may be obtained and correlated to specific locations. In other embodiments, light signals may be used to update a price label associated with an article of merchandise, such as be transmission of coded light signals to the security device 40 and/or the article of merchandise.

In another embodiment, the security device 40 and/or the article of merchandise M may be configured to capture an image for obtaining various data or information regarding the security device and/or the article of merchandise. For example, the article of merchandise M may capture an image and store the image including various information and data that can be extracted to identify the article of merchandise. In one embodiment, meta data may be embedded in the image file which can be remotely extracted, such as via the controller 20 and/or the remote device 30, to determine a make and model number of the article of merchandise M. In some cases, the article of merchandise M may record the image using technology such as an Eye-Fi memory card that is configured to sync automatically with certain devices image library, which may be used to obtain meta data embedded in the image (e.g., EXIF information).

In some embodiments, the image captured also contains data indicating the location of the article of merchandise taking the image. For example, a position of an article of merchandise M (e.g., a DSLR camera) may involve an initial setup whereby an associate takes a photograph of the position, security device 40, stand, or placard. The position, security device 40, stand, or placard may have a small QR code or other artifact with data regarding physical position/location. In another example, this may be a code on a price label wherein the location data can be used to automatically confirm that the correct article of merchandise is located behind or near its associated price tag. The captured image with the associated location data may be used in conjunction with data identifying the article of merchandise (e.g., meta data) to confirm whether the article of merchandise is in its correct location.

Many modifications and other embodiments of the invention will be readily apparent to one skilled in the art having the benefit of the teachings presented in the foregoing descriptions and the associated drawings. Therefore, it is understood and appreciated that the invention is not to be limited to the specific embodiments disclosed herein, and that modifications to the disclosed embodiments and other undisclosed embodiments are intended to be included within the scope of the appended claims.

That which is claimed is:

1. A merchandise security system comprising:
   at least one security device configured to be attached to an article of merchandise at a display position having a known location;
   an illumination source associated with the at least one security device and/or the article of merchandise, the illumination source configured to generate a light signal; and
   at least one computing device configured to communicate with the illumination source in order to obtain data from the at least one security device and/or the article of merchandise based on the light signal, wherein the data comprises the known location of the display position of the at least one security device,
   wherein the at least one security device is configured to generate a security signal in response to removal of the article of merchandise from the security device.

2. The merchandise security system of claim 1, wherein the data comprises a make or model number of the article of merchandise.

3. The merchandise security system of claim 1, wherein each illumination source is configured to generate the light signal in a pattern or sequence that is indicative of the data.

4. The merchandise security system of claim 1, wherein the at least one security device is configured to wirelessly communicate with a remote device for providing the data obtained from the article of merchandise.

5. The merchandise security system of claim 1, wherein the data comprises information regarding the at least one security device.

6. The merchandise security system of claim 5, wherein the at least one computing device is configured to correlate the data with the information regarding the at least one security device.

7. The merchandise security system of claim 1, wherein the data comprises identification information for the article of merchandise.

8. The merchandise security system of claim 1, wherein the data comprises a serial number for the article of merchandise.

9. The merchandise security system of claim 1, wherein the computing device comprises an illumination source configured to communicate information to the at least one security device and/or the article of merchandise.

10. The merchandise security system of claim 1, wherein the at least one security device is configured to transfer data from the article of merchandise attached thereto.

11. The merchandise security system of claim 1, wherein the at least one security device comprises alarming circuitry for generating an audible and/or a visual signal in response to removal of the article of merchandise from the security device.

12. The merchandise security system of claim 1, further comprising at least one controller configured to communicate with the at least one security device for obtaining the data.

13. The merchandise security system of claim 12, wherein the at least one controller is configured to wirelessly communicate with a remote device for providing the data obtained from the article of merchandise.

14. The merchandise security system of claim 12, wherein the at least one controller is configured to communicate with a memory of the article of merchandise in order to obtain data from the article of merchandise.

15. The merchandise security system of claim 1, wherein the at least one illumination source and the at least one computing device are configured to communicate via visible light communication (VLC).

16. The merchandise security system of claim 1, wherein the at least one computing device comprises a camera for detecting the light signal.

17. The merchandise security system of claim 1, wherein the at least one security device and/or the article of merchandise is configured to communicate a light signal indicative of its location.

18. The merchandise security system of claim 1, further comprising a plurality of security devices and a plurality of illumination sources, each illumination source associated with one of the security devices and/or the articles of merchandise, wherein the at least one computing device is configured to communicate with each of the illumination sources in order to obtain the data from the security devices and/or the articles of merchandise.

19. A method for displaying and securing an article of merchandise, the method comprising:
   generating a light signal with an illumination source associated with a security device and/or an article of merchandise, the security device configured to be attached to the article of merchandise at a display position having a known location;

detecting the light signal with a computing device;

obtaining data from the security device and/or the article of merchandise based on the light signal, wherein the data comprises the known location of the display position of the security device; and generating a security signal in response to removal of the article of merchandise from the security device.

20. The method of claim 19, further comprising providing the data over a wireless network.

21. The method of claim 19, wherein obtaining comprises obtaining a make or model number of the article of merchandise.

22. The method of claim 19, further comprising wirelessly communicating with a remote device for providing the data obtained from the article of merchandise.

23. The method of claim 19, further comprising determining a location of the security device and/or the article of merchandise based on the light signal.

\* \* \* \* \*